(No Model.)
H. H. BLADES.
ELECTRIC MOTOR.
No. 435,639. Patented Sept. 2, 1890.
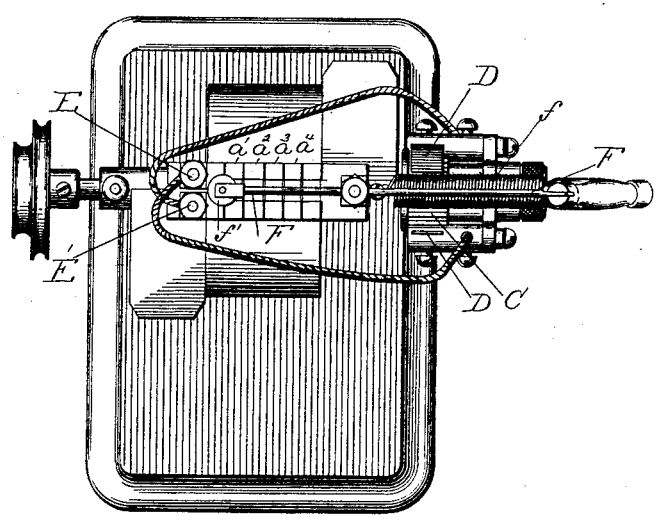
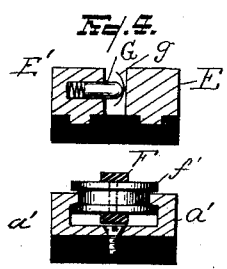
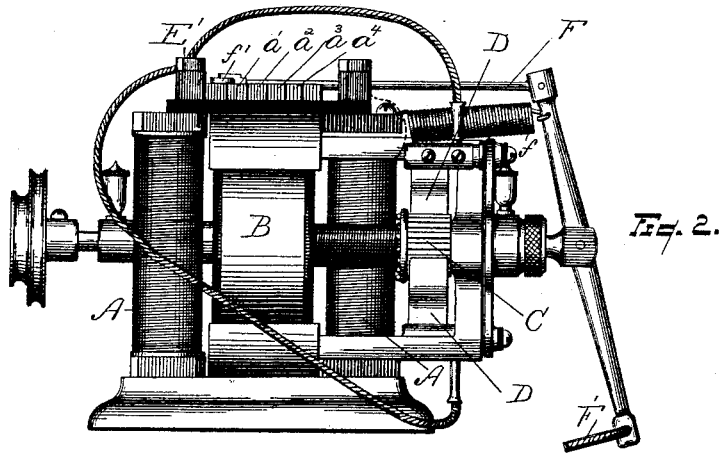
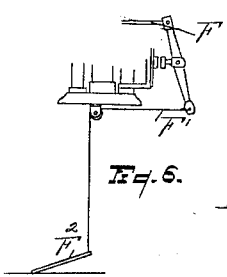
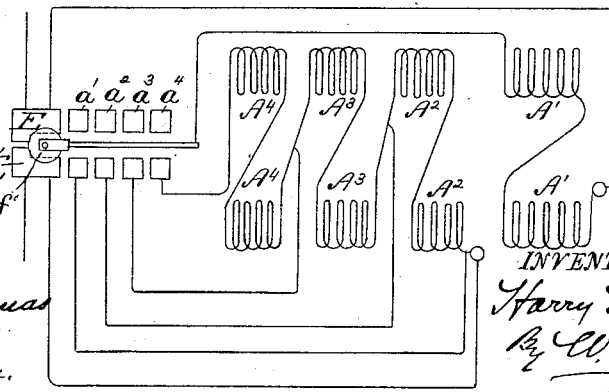
WITNESSES
Samuel E. Thomas
W. H. Chamberlin.
INVENTOR.
Harry H. Blades.
By C. W. W. Leggett
Attorney

UNITED STATES PATENT OFFICE.

HARRY H. BLADES, OF DETROIT, MICHIGAN, ASSIGNOR TO THE DETROIT MOTOR COMPANY, OF SAME PLACE.

ELECTRIC MOTOR.

SPECIFICATION forming part of Letters Patent No. 435,639, dated September 2, 1890.

Application filed September 25, 1888. Serial No. 286,359. (No model.)

*To all whom it may concern:*

Be it known that I, HARRY H. BLADES, a citizen of the United States, residing at Detroit, county of Wayne, State of Michigan, have invented a certain new and useful Improvement in Electric Motors; and I declare the following to be a full, clear, and exact description of the same, such as will enable others skilled in the art to which it appertains to make and use the same, reference being had to the accompanying drawings, which form a part of this specification.

In the drawings, Figure 1 is a plan view, and Fig. 2 is a side elevation, of an electric motor embodying my invention. Fig. 3 is a diagrammatic view illustrating the invention. Figs. 4 and 5 are detail views. Fig. 6 is a side elevation showing the lever and treadle mechanism.

My invention has for its object the construction of a motor with manipulating switch mechanism connected directly therewith, said mechanism adapted to govern the admission of the current to the motor.

The motor illustrated in the drawings is one in which the armature is located on a shunt, and the fields are provided with several independent windings of wire, the switch being employed for directing the current through one or more of these windings upon the field-magnets, as desired, and thus varying in a corresponding degree the energy exerted by the motor.

In carrying out my invention A represents the field-magnets, B the armature, C the commutator, and D the commutator-brushes of an electric motor.

E and E' represent the binding-posts for the main line.

$a'$ $a^2$ $a^3$ $a^4$ represent terminals. The parts $a'$ $a'$ are connected together, so as to constitute but one terminal, as shown in Fig. 5, this form being given to insure a better engagement with the contact-wheel, and the same is true of $a^2$ $a^2$, &c.

Now referring to the diagram, Fig. 3, A' A² A³ A⁴ may represent the independent windings upon the field-magnets. F is a longitudinally-movable switch-lever. F' is a cord or strap, connected with a treadle F² for traversing the switch-lever, and $f$ is a spring for retracting the same to its initial position. The switch-lever F carries a contact-wheel $f'$, having a grooved periphery to engage the edges of the terminals and so insure contact on at least one side.

The operation of the device will now be understood: The contact-wheel $f'$ on the switch-lever being in the position shown in Fig. 3, the current is short-circuited through the binding-posts E E' and the said contact-wheel, and is not admitted into the motor. When it is desired to start the machine, the operator presses upon the foot-treadle and advances the switch to the terminals $a'$, the current from the main line passes through the winding A' of the field-magnets, thence back through the switch-lever to the terminals $a'$, and thence off on the main line. This results in shunting a corresponding amount of current through the armature B, and the motor is enabled to develop an energy commensurate therewith. If the energy is not sufficient, a further depression of the treadle advances the contact-wheel $f'$ of the switch to the terminals $a^2$. The current upon the main line is thus deflected first through the windings A', then through the switch and the terminals $a^2$, thence through the windings A² of the fields, and thence to the main line, and of course shunts a correspondingly-greater current through the armature B, and the motor develops an energy commensurate therewith. In like manner, if more energy is required, the switch is advanced to the terminals $a^3$, in which event the current is deflected through the windings A', A², and A³, or the switch may be advanced to the terminals $a^4$, which serves to deflect the current through all of the windings of the field-magnets, and develops the maximum energy of the motor. In all these cases, it will be observed that the current passes first through the switch lever or bar F before it reaches the terminals, and the switch engages only the terminals corresponding with one end of the corresponding winding of the field-magnet, the construction being such as shown by the diagram, that the other ends of each said coils are always in closed circuit. This construction decreases very materially the liability of broken circuits, since engagement has to be made with only one terminal for each winding. Of course I do not limit myself to a construction in which the switch-lever is engaged with a foot-treadle, for it might equally well be engaged with a hand-lever if the circumstances required such arrangement, without departing from my invention. So, also, I would not limit myself to the particular construction of switch lever or bar F and its actuating mechanism, for this might be varied. The wheel $f'$, recessed to engage the edges of the terminals, as shown, is a very convenient and effective construction, since it effectually guards against disengagement by any ordinary accident, and insures a contact on at least one of its sides.

G is a spring-plunger located within one of the binding-posts E E'. It projects across and bears against the other binding-post. A piece of rice-paper $g$, or other equivalent nonconducting material, is interposed between the plunger and the other post, so as to prevent them coming into electrical connection with each other. The purpose is to constitute a safeguard against injury by the current in the machine when in use, for it is apparent that should any wire be severed leading to the field-magnets, the current would necessarily have to take a course through the armature, and vice versa, and this might operate to burn out the machine or cause the current to short-circuit somewhere within the motor. The rice paper or insulator $g$ obviates this danger, for while it offers a resistance greater than that afforded by the machine when in its normal operation it would, under the above circumstances by reason of the increased resistance within the machine, burn through and permit the plunger G to connect with the other binding-post, thereby short-circuiting the current at this point. Of course it is not essential that this plunger and insulator $g$ should be located at just the point indicated, but may be located at any point where it may burn out the insulator and short-circuit the current.

What I claim is—

In an electric motor in which the field-magnets are provided with a series of independent windings of wire, the combination, with the terminals $a'$ $a^2$ $a^3$ $a^4$, each formed in two connected parts arranged on said motor, of the longitudinally-movable switch-lever F, coupled into the circuit of the field-magnets, a grooved contact-wheel $f'$, carried by the switch-lever and adapted to be engaged with the said terminals in succession, means for actuating the switch-lever in the direction of its length, and a spring $f$ for retracting said lever to its initial position, substantially as described.

In testimony whereof I sign this specification in the presence of two witnesses.

HARRY H. BLADES.

Witnesses:
M. B. O'DOUGHERTY,
W. H. CHAMBERLIN.